United States Patent
Hannuksela (10) Patent No.: US 7,894,521 B2
(45) Date of Patent: Feb. 22, 2011

(54) GROUPING OF IMAGE FRAMES IN VIDEO CODING

(75) Inventor: Miska Hannuksela, Tampere (FI)

(73) Assignee: Nokia Corporation, Espoo (FI)

( * ) Notice: Subject to any disclaimer, the term of this patent is extended or adjusted under 35 U.S.C. 154(b) by 2189 days.

(21) Appl. No.: 10/306,942

(22) Filed: Nov. 29, 2002

(65) Prior Publication Data

US 2003/0138043 A1 Jul. 24, 2003

(30) Foreign Application Priority Data

Jan. 23, 2002 (FI) .................................. 20020127

(51) Int. Cl.
  *H04N 7/12* (2006.01)
  *H04N 11/02* (2006.01)
  *H04N 11/04* (2006.01)
  *H04B 1/66* (2006.01)
(52) U.S. Cl. ................................. 375/240.12
(58) Field of Classification Search ....................... None
  See application file for complete search history.

(56) References Cited

U.S. PATENT DOCUMENTS

| | | | |
|---|---|---|---|
| 4,390,966 A | 6/1983 | Kawashima et al. | |
| 5,122,875 A | 6/1992 | Raychaudhuri et al. | |
| 5,144,426 A | 9/1992 | Tanaka et al. | |
| 5,699,476 A | 12/1997 | Van Der Meer | |
| 5,774,593 A | 6/1998 | Zick et al. | |
| 5,838,265 A | 11/1998 | Adolph | |
| 5,852,630 A | 12/1998 | Langberg | |
| 5,877,812 A | 3/1999 | Krause et al. | |
| 6,072,831 A | 6/2000 | Chen | |
| 6,094,456 A | 7/2000 | Ueda | |

(Continued)

FOREIGN PATENT DOCUMENTS

CN     1173783 A     2/1998

(Continued)

OTHER PUBLICATIONS

Oct. 9-17, 2002, Joint Video Team of ISO/IEC MPEG and ITU-T VCEG, *Editor's Proposed Draft Text Modification for Joint Video Specification (ITU-T Rec. 264 ISO/IEC 14496-10 AVC)*, Geneva modifications draft 37.).

(Continued)

*Primary Examiner*—Nhon T Diep
(74) *Attorney, Agent, or Firm*—Hollingsworth & Funk, LLC (57) ABSTRACT

A method for coding video frames for forming a scalable, compressed video sequence comprising video frames coded according to at least a first and a second frame format. The video frames of the first frame format are independent video frames, and the video frames of the second frame format are predicted from at least one of the other video frames. The video sequence has a first sub-sequence determined therein, at least part of the first sub-sequence being formed by coding at least video frames of the first frame format; and with at least a second sub-sequence, at least part of which is formed by coding video frames of the second frame format, and at least one video frame of the second sub-sequence having been predicted from at least one video frame of the first sub-sequence. Frame identifier data of the second sub-sequence is determined into the video sequence.

24 Claims, 4 Drawing Sheets

U.S. PATENT DOCUMENTS

| | | | |
|---|---|---|---|
| 6,108,382 | A | 8/2000 | Gringeri et al. |
| 6,266,158 | B1 | 7/2001 | Hata et al. |
| 6,307,886 | B1 | 10/2001 | Westermann |
| 6,314,139 | B1 | 11/2001 | Koto et al. |
| 6,330,286 | B1 * | 12/2001 | Lyons et al. ........... 375/240.28 |
| 6,337,881 | B1 | 1/2002 | Chaddha |
| 6,363,208 | B2 * | 3/2002 | Nitta et al. ..................... 386/75 |
| 6,496,980 | B1 * | 12/2002 | Tillman et al. ................ 725/90 |
| 6,510,553 | B1 * | 1/2003 | Hazra .......................... 725/87 |
| 6,614,936 | B1 * | 9/2003 | Wu et al. .................... 382/238 |
| 6,639,943 | B1 * | 10/2003 | Radha et al. ........... 375/240.11 |
| 6,806,909 | B1 * | 10/2004 | Radha et al. ............. 348/384.1 |
| 7,103,669 | B2 | 9/2006 | Apostolopoulos |
| 2001/0024472 | A1 | 9/2001 | Sporer et al. |
| 2001/0040700 | A1 | 11/2001 | Hannuksela et al. |
| 2002/0051621 | A1 | 5/2002 | Cuccia |
| 2003/0063806 | A1 | 4/2003 | Kim et al. |

FOREIGN PATENT DOCUMENTS

| | | |
|---|---|---|
| EP | 0798932 | 10/1997 |
| EP | 0898427 | 2/1999 |
| EP | 1 005 232 | 5/2000 |
| JP | 4348690 | 12/1992 |
| JP | 10-271511 | 10/1998 |
| JP | 11-177987 | 2/1999 |
| JP | 11275576 | 10/1999 |
| RU | 2 123 769 | 12/1998 |
| RU | 2137197 C1 | 9/1999 |
| WO | WO 00/67469 | 9/2000 |
| WO | WO 01/47283 | 6/2001 |
| WO | 01/84850 | 11/2001 |
| WO | WO 02/054776 | 11/2002 |

OTHER PUBLICATIONS

Jan. 15, 1998, ITU-Telecommunications Standardization Union, *Draft Text of Recommendation H.263 Version 2 ("H.263+") for Decision.*

Jul. 10, 2002, ITU-Telecommunications Standardization Union, *H.26L Test Model Long Term No. 8 (TML-8) Draft0*, Document VCEG-N10. pp. 1-46.

Nov. 2000, ITU-Telecommunications Standardization Union, *Draft for "H.263++" Annexes U, V, and W to Recommendation H.263.*

Nov. 12, 2002, David Singer and Toby Walker, *Study Text of ISO/IEC 14496-15/FCD*, pp. 1-25.

Nov. 12, 2002, David Singer and Toby Walker, *Study Text of ISO/IEC 14496-15/FCD (Revised)*, pp. 1-26.

Hannuksela, M et al.; Sub-Picture: ROI Coding and Unequal Error Protection, IEEE 2002 Conference, Sep. 2002, USA (Internet publication).

Hannuksela, M et al.; Sub-Picture: Video-Coding and Unequal Error Protection, XI European Signal Processing Conference, Sep. 2002, Toulouse, France (internet publication).

Wang, Y.K. et al.: Core Experiment Description of Sub-Picture Coding. ITU 15. Meeting 3.-Jul. 12, 2001, Pattaya, Thailand (internet publication).

B.A. Lokshin, "Digital Broadcasting: from Studio to Audience" Cyrus Systems, Moscow, 2001. (translation included).

Wenger, "Temporal Scalability Using P-pictures for Low-latency Applications", IEEE Workshop, Dec. 1998, pp. 559-564.

English Translation of the Office Action of parallel Japanese application No. 2006-120296 dated Jan. 6, 2010.

Allowance Notification with translation dated Feb. 4, 2010 from parallel Russian Application No. 2006110322, 17 pages.

Translated Office Action dated Feb. 25, 2010 from parallel Japanese Application No. 2006-120297, 5 pages.

Elloumi et al., "Issues in Multimedia Scaling: the MPEG Video Streams Case", Emerging Technologies and Applications in Communications, IEEE Computer Society, May 7, 1996.

Hannuksela, "Enhanced Concept of GOP", Joint Video Team of ISO-IES MPEG 7 itu-T VCEG, Feb. 1, 2002.

Soderquist et al., "Memory Traffic and Data Cache Behavior of an MPEG-2 Software Decoder", IEEE Computer Society, Oct. 12, 1997.

Office Action of related European application No. 06101013.8 dated Feb. 2, 2010.

Office Action of related European application No. 06101014.6 dated Feb. 2, 2010.

Illgner et al., "Spatially Scalable Video Compression Employing Resolution Pyramids", IEEE Journal on Selected Areas in Communications, vol. 15, No. 9, Dec. 1, 2007, pg. 1688-1703.

Information Technology — Generic Coding of Moving Pictures and Associated Audio Information: Systems, ISO/IEC 13818-1, Second edition, Dec. 1, 2000, 174 pages.

Notice of Allowance dated May 5, 2010 from Russian Application No. 2006110321/09, 11 pages.

Office Action dated Jun. 17, 2010 from U.S. Appl. No. 11/338,996, 30 pages.

Office Action dated May 25, 2010 from U.S. Appl. No. 11/338,934, 29 pages.

Office Action Response dated Sep. 10, 2010 from U.S. Appl. No. 11/338,996, 10 pages.

Office Action Response dated Sep. 17, 2010 from U.S. Appl. No. 11/338,934, 10 pages.

Translated Office Action dated Aug. 17, 2010 from parallel Japanese Application No. 2006-120297, 4 pages.

Translated Office Action dated Aug. 24, 2010 from parallel Japanese Application No. 2006-120296, 5 pages.

* cited by examiner

GROUPING OF IMAGE FRAMES IN VIDEO CODING

FIELD OF THE INVENTION

The invention relates to the grouping of multimedia files, particularly video files and particularly in connection with streaming.

BACKGROUND OF THE INVENTION

The term 'streaming' refers to simultaneous sending and playback of data, typically multimedia data, such as audio and video files, in which the recipient may begin data playback already before all the data to be transmitted has been received. Multimedia data streaming systems comprise a streaming server and terminal devices that the recipients use for setting up a data connection, typically via a telecommunications network, to the streaming server. From the streaming server the recipients retrieve either stored or real-time multimedia data, and the playback of the multimedia data can then begin, most advantageously almost in real-time with the transmission of the data, by means of a streaming application included in the terminal.

From the point of view of the streaming server, the streaming may be carried out either as normal streaming or as progressive downloading to the terminal. In normal streaming the transmission of the multimedia data and/or the data contents are controlled either by making sure that the bit rate of the transmission substantially corresponds to the playback rate of the terminal device, or, if the telecommunications network used in the transmission causes a bottleneck in data transfer, by making sure that the bit rate of the transmission substantially corresponds to the bandwidth available in the telecommunications network. In progressive downloading the transmission of the multimedia data and/or the data contents do not necessarily have to be interfered with at all, but the multimedia files are transmitted as such to the recipient, typically by using transfer protocol flow control. The terminals then receive, store and reproduce an exact copy of the data transmitted from the server, which copy can then be later reproduced again on the terminal without needing to start a streaming again via the telecommunications network. The multimedia files stored in the terminal are, however, typically very large and their transfer to the terminal is time-consuming, and they require a significant amount of storage memory capacity, which is why a normal streaming is often preferred.

The video files in multimedia files comprise a great number of still image frames, which are displayed rapidly in succession (of typically 15 to 30 frames per s) to create an impression of a moving image. The image frames typically comprise a number of stationary background objects, determined by image information which remains substantially unchanged, and few moving objects, determined by image information that changes to some extent. The information comprised by consecutively displayed image frames is typically largely similar, i.e. successive image frames comprise a considerable amount of redundancy. The redundancy appearing in video files can be divided into spatial, temporal and spectral redundancy. Spatial redundancy refers to the mutual correlation of adjacent image pixels, temporal redundancy refers to the changes taking place in specific image objects in subsequent frames, and spectral redundancy to the correlation of different colour components within an image frame.

To reduce the amount of data in video files, the image data can be compressed into a smaller form by reducing the amount of redundant information in the image frames. In addition, while encoding, most of the currently used video encoders downgrade image quality in image frame sections that are less important in the video information. Further, many video coding methods allow redundancy in a bit stream coded from image data to be reduced by efficient, lossless coding of compression parameters known as VLC (Variable Length Coding).

In addition, many video coding methods make use of the above-described temporal redundancy of successive image frames. In that case a method known as motion-compensated temporal prediction is used, i.e. the contents of some (typically most) of the image frames in a video sequence are predicted from other frames in the sequence by tracking changes in specific objects or areas in successive image frames. A video sequence always comprises some compressed image frames the image information of which has not been determined using motion-compensated temporal prediction. Such frames are called INTRA-frames, or I-frames. Correspondingly, motion-compensated video sequence image frames predicted from previous image frames, are called INTER-frames, or P-frames (Predicted). The image information of P-frames is determined using one I-frame and possibly one or more previously coded P-frames. If a frame is lost, frames dependent on it can no longer be correctly decoded.

An I-frame typically initiates a video sequence defined as a Group of Pictures (GOP), the P-frames of which can only be determined on the basis of the I-frame and the previous P-frames of the GOP in question. The next I-frame begins a new group of pictures GOP, the image information comprised by which cannot thus be determined on the basis of the frames of the previous GOP. In other words, groups of pictures are not temporally overlapping, and each group of picture can be decoded separately. In addition, many video compression methods employ bi-directionally predicted B-frames (Bi-directional), which are set between two anchor frames (I- and P-frames, or two P-frames) within a group of pictures GOP, the image information of a B-frame being predicted from both the previous anchor frame and the one succeeding the B-frame. B-frames therefore provide image information of higher quality than P-frames, but typically they are not used as anchor frames, and therefore their removal from the video sequence does not degrade the quality of subsequent images. However, nothing prevents B-frames from being used as anchor frames as well, only in that case they cannot be removed from the video sequence without deteriorating the quality of the frames dependent on them.

Each video frame may be divided into what are known as macroblocks that comprise the colour components (such as Y, U, V) of all pixels of a rectangular image area. More specifically, a macroblock consists of at least one block per colour component, the blocks each comprising colour values (such as Y, U or V) of one colour level in the image area concerned. The spatial resolution of the blocks may differ from that of the macroblocks, for example U- and V-components may be displayed using only half of the resolution of Y-component. Macroblocks can be further grouped into slices, for example, which are groups of macroblocks that are typically selected in the scanning order of the image. Temporal prediction is typically carried out in video coding methods block- or macroblock-specifically, instead of image-frame-specifically.

To allow for flexible streaming of video files, many video coding systems employ scalable coding in which some elements or element groups of a video sequence can be removed without affecting the reconstruction of other parts of the video sequence. Scalability is typically implemented by grouping the image frames into a number of hierarchical layers. The image frames coded into the image frames of the base layer substantially comprise only the ones that are compulsory for the decoding of the video information at the receiving end. The base layer of each group of pictures GOP thus comprises one I-frame and a necessary number of P-frames. One or more enhancement layers can be determined below the base layer, each one of the layers improving the quality of the video coding in comparison with an upper layer. The enhancement layers thus comprise P- or B-frames predicted on the basis of motion-compensation from one or more upper layer images. The frames are typically numbered according to an arithmetical series.

In streaming, transmission bit rate must be controllable either on the basis of the bandwidth to be used or the maximum decoding or bit rate value of the recipient. Bit rate can be controlled either at the streaming server or in some element of the telecommunications network, such as an Internet router or a base station of a mobile communications network. The simplest means for the streaming server to control the bit rate is to leave out B-frames having a high information content from the transmission. Further, the streaming server may determine the number of scalability layers to be transmitted in a video stream, and thus the number of the scalability layers can be changed always when a new group of pictures GOP begins. It is also possible to use different video sequence coding methods. Correspondingly, B-frames, as well as other P-frames of the enhancement layers, can be removed from the bit stream in a telecommunications network element.

The above arrangement involves a number of drawbacks. Many coding methods, such as the coding according to the ITU-T (International Telecommunications Union, Telecommunications Standardization Sector) standard H.263, are familiar with a procedure called reference picture selection. In reference picture selection at least a part of a P-image has been predicted from at least one other image than the one immediately preceding the P-image in the time domain. The selected reference image is signalled in a coded bit stream or in bit stream header fields image-, image-segment- (such as a slice or a group of macroblocks), macroblock-, or block-specifically. The reference picture selection can be generalized such that the prediction can also be made from images temporally succeeding the image to be coded. Further, the reference picture selection can be generalized to cover all temporally predicted frame types, including B-frames. Since it is possible to also select at least one image preceding an I-image that begins a group of pictures GOP as the reference image, a group of pictures employing reference picture selection cannot necessarily be decoded independently. In addition, the adjusting of scalability or coding method in the streaming server or a network element becomes difficult, because the video sequence must be decoded, parsed and buffered for a long period of time to allow any dependencies between different image groups to be detected.

Another problem in the prior art coding methods is that there is no useful method of signalling differences of significance between INTER-frames. For example, when a plural number of P-frames are to be predicted successively, the first P-frames are usually the most significant ones for the reconstruction because there are more image frames that are dependent on the first P-frame than on subsequent P-frames. However, known coding methods fail to provide a simple method for signalling such differences in significance.

A further problem relates to the insertion of a video sequence in the middle of another video sequence, which has typically led to discontinuity in image numbering. The numbering of video sequence images is typically used for detecting the loss of image frames. However, if a separate video sequence, such as a commercial, is inserted into a video sequence, the separate video sequence is typically provided with separate image numbering, which is not in line with the ascending image numbering of the original video sequence. The receiving terminal may therefore interpret the deviating image numbering as a signal of lost image frames and start unnecessary actions to reconstruct the image frames suspected as lost or to request a re-transmission thereof. A similar problem is encountered when scaling a video sequence: for example, if a plural number of successive frames is removed, the receiving terminal may unnecessarily interpret these removals as protocol errors.

BRIEF DESCRIPTION OF THE INVENTION

It is therefore an object of the invention to provide a method and equipment implementing the method that allow the disadvantages caused by the above problems to be reduced. The objects of the invention are achieved by a method, video encoder, video decoder, streaming system element and computer programs that are characterized by what is stated in the independent claims.

The preferred embodiments of the invention are disclosed in the dependent claims.

The invention is based on the idea of coding a scalable, compressed video sequence that comprises video frames coded on the basis of at least a first and a second frame format, the video frames conforming to the first frame format being independent of other video frames, i.e. they are typically I-frames, and the video frames according to the second frame format being frames predicted from at least one other video frame, for example P-frames. A video sequence comprises a first sub-sequence formed therein, at least part of the sub-sequence being formed by coding video frames (I-frames) of the at least first frame format (I-frames), and at least a second sub-sequence, at least part of which is formed by coding video frames of the at least second frame format (e.g. P-frames), at least one video frame of the second sub-sequence having been predicted from at least one video frame of the first sub-sequence. In addition, identifying data of the video frames comprised by the at least second sub-sequence are determined into the video sequence in question.

Consequently, an essential aspect of the present invention is to determine the sub-sequences each sub-sequence is dependent on, i.e. a sub-sequence will comprise information of all sub-sequences that have been directly used for predicting the image frames comprised by the sub-sequence in question. This information is signalled in the bit stream of the video sequence, preferably separate from the actual image information, whereby the image data comprised by the video sequence can preferably be scaled, because independently decodable portions of the video sequence can be easily determined, and the portions can be removed without affecting the decoding of the rest of the image data.

According to a preferred embodiment of the invention, a scalable coding hierarchy is formed for the video sequences, according to which hierarchy a first scalability layer of the video sequence is coded in such a way that it comprises at least video frames of the first frame format, i.e. I-frames, and the lower scalability layers of the video sequence are coded such that they comprise at least video frames of the second frame format, i.e. P- and/or B-frames, grouped into sub-sequences in which at least one video frame is predicted either from a video frame of an upper scalability layer or from another video frame of the same sub-sequence. The number of the scalability layers is not restricted.

According to a preferred embodiment of the invention, a unique identifier combining the scalability layer number, sub-sequence identifier and image number is determined for each video frame. The identifier can be included into a header field of the video sequence, or into a header field according to the transfer protocol to be used for the video sequence transfer.

An advantage of the procedure of the invention is that it provides a flexible coding hierarchy that enables, on one hand, the scaling of the bit rate of a video sequence to be transmitted without video sequence decoding being required, and, on the other hand, independent decoding of each sub-sequence. This allows the streaming server, for example, to adjust the bit rate advantageously, without video sequence decoding, parsing and buffering, because the streaming server is capable of deducing the inter-dependencies of the different sub-sequences directly from the identifiers and their inter-dependencies. Further, the streaming server may, when necessary, carry out sub-sequence-specific adjusting of the scalability or the coding employed, because the inter-dependencies of the different frames are known. A further advantage is that the coding hierarchy and the image numbering of the invention allow a separate video sequence to the easily inserted into another video sequence.

BRIEF DESCRIPTION OF THE DRAWINGS

In the following, the invention will be described in connection with the preferred embodiments and with reference to the accompanying drawings, in which.

DETAILED DESCRIPTION OF THE INVENTION

In the following, a general-purpose multimedia data streaming system is disclosed, the basic principles of which can be applied in connection with any telecommunications system. Although the invention is described here with a particular reference to a streaming system, in which the multimedia data is transmitted most preferably through a telecommunications network employing a packet-switched data protocol, such as an IP network, the invention can equally well be implemented in circuit-switched networks, such as fixed telephone networks PSTN/ISDN (Public Switched Telephone Network/integrated Services Digital Network) or in mobile communications networks PLMN (Public Land Mobile Network). Further, the invention can be applied in the streaming of multimedia files in the form of both normal streaming and progressive downloading, and for implementing video calls, for example.

It is also to be noted that although the invention is described here with a particular reference to streaming systems and the invention can also be advantageously applied in them, the invention is not restricted to streaming systems alone, but can be applied in any video reproduction system, irrespective of how a video file that is to be decoded is downloaded and where it is downloaded from. The invention can therefore be applied for example in the playback of a video file to be downloaded from a DVD disc or from some other computer memory carrier, for example in connection with varying processing capacity available for video playback. In particular, the invention can be applied to different video codings of low bit rate that are typically used in telecommunications systems subject to bandwidth restrictions. One example is the system defined in the ITU-T standard H.263 and the one that is being defined in H.26L (possibly later to become H.264). In connection with these, the invention can be applied to mobile stations, for example, in which case the video playback can be made to adjust both to changing transfer capacity or channel quality and to the processor power currently available, when the mobile station is used also for executing other applications than video playback.

It is further to be noted that, for the sake of clarity, the invention will be described below by giving an account of image frame coding and temporal predicting on image frame level. However, in practice coding and temporal predicting typically take place on block or macroblock level, as described above.

Figure 1:
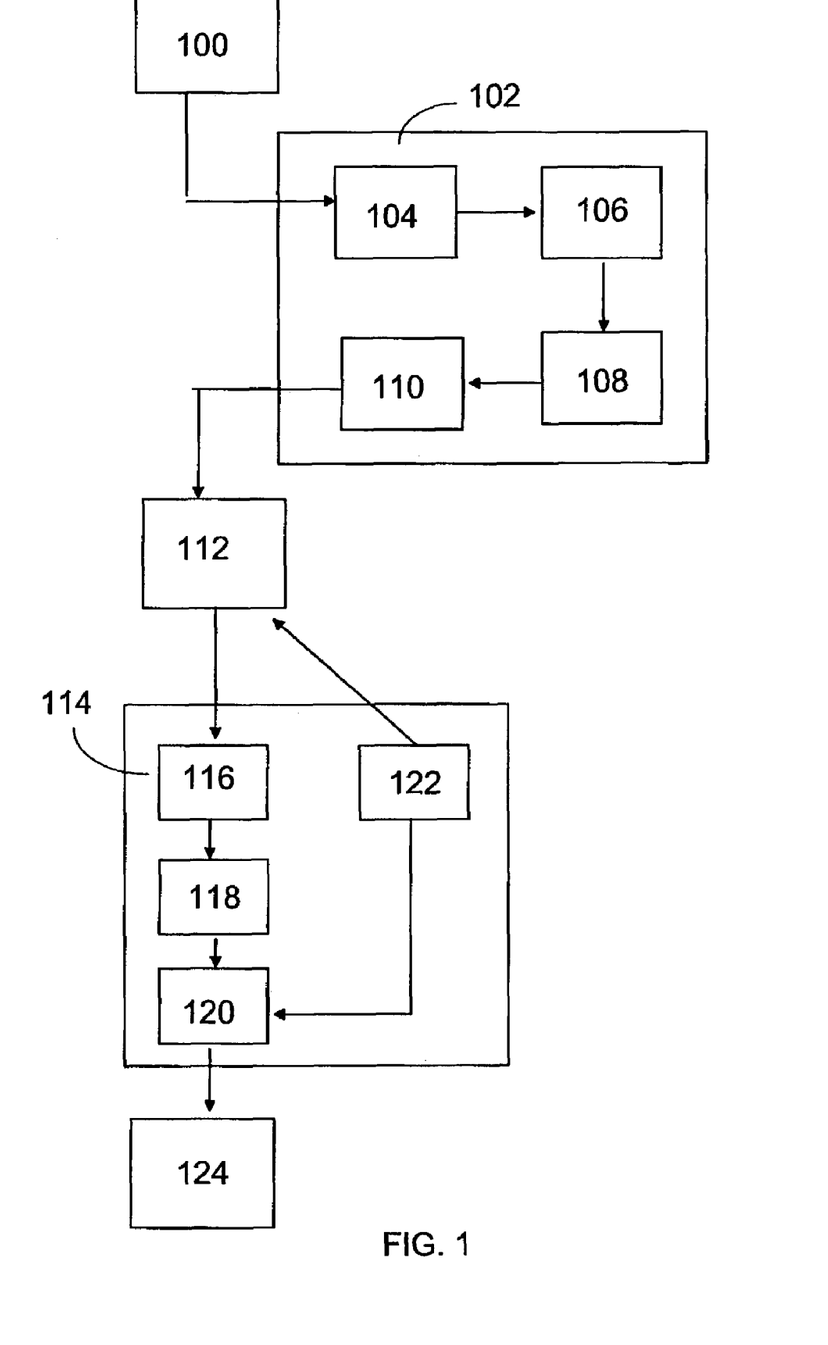
FIG. 1 illustrates a common multimedia data streaming system in which the scalable coding hierarchy of the invention can be applied.

With reference to FIG. 1, a typical multimedia streaming system will be described, which is a preferred system for applying the procedure of the invention.

A multimedia data streaming system typically comprises one or more multimedia sources 100, such as a video camera and a microphone, or video image or computer graphic files stored in a memory carrier. Raw data obtained from the different multimedia sources 100 is combined into a multimedia file in an encoder 102, which can also be referred to as an editing unit. The raw data arriving from the one or more multimedia sources 100 is first captured using capturing means 104 included in the encoder 102, which capturing means can be typically implemented as different interface cards, driver software, or application software controlling the function of a card. For example, video data may be captured using a video capture card and the associated software. The output of the capturing means 104 is typically either an uncompressed or slightly compressed data flow, for example uncompressed video frames of the YUV 4:2:0 format or motion-JPEG image format, when a video capture card is concerned.

An editor 106 links different media flows together to synchronize video and audio flows to be reproduced simultaneously as desired. The editor 106 may also edit each media flow, such as a video flow, by halving the frame rate or by reducing spatial resolution, for example. The separate, although synchronized, media flows are compressed in a compressor 108, where each media flow is separately compressed using a compressor suitable for the media flow. For example, video frames of the YUV 4:2:0 format may be compressed using the low bit rate video coding according to the ITU-T recommendation H.263 or H.26L. The separate, synchronized and compressed media flows are typically interleaved in a multiplexer 110, the output obtained from the encoder 102 being a single, uniform bit flow that comprises data of a plural number of media flows and that may be referred to as a multimedia file. It is to be noted that the forming of a multimedia file does not necessarily require the multiplexing of a plural number of media flows into a single file, but the streaming server may interleave the media flows just before transmitting them.

The multimedia files are transferred to a streaming server 112, which is thus capable of carrying out the streaming either as real-time streaming or in the form of progressive downloading. In progressive downloading the multimedia files are first stored in the memory of the server 112 from where they may be retrieved for transmission as need arises. In real-time streaming the editor 102 transmits a continuous media flow of multimedia files to the streaming server 112, and the server 112 forwards the flow directly to a client 114. As a further option, real-time streaming may also be carried out such that the multimedia files are stored in a storage that is accessible from the server 112, from where real-time streaming can be driven and a continuous media flow of multimedia files is started as need arises. In such case, the editor 102 does not necessarily control the streaming by any means. The streaming server 112 carries out traffic shaping of the multimedia data as regards the bandwidth available or the maximum decoding and playback rate of the client 114, the streaming server being able to adjust the bit rate of the media flow for example by leaving out B-frames from the transmission or by adjusting the number of the scalability layers. Further, the streaming server 112 may modify the header fields of a multiplexed media flow to reduce their size and encapsulate the multimedia data into data packets that are suitable for transmission in the telecommunications network employed. The client 114 may typically adjust, at least to some extent, the operation of the server 112 by using a suitable control protocol. The client 114 is capable of controlling the server 112 at least in such a way that a desired multimedia file can be selected for transmission to the client, in addition to which the client is typically capable of stopping and interrupting the transmission of a multimedia file.

When the client 114 is receiving a multimedia file, the file is first supplied to a demultiplexer 116, which separates the media flows comprised by the multimedia file. The separate, compressed media flows are then supplied to a decompressor 118 where each separate media flow is decompressed by a decompressor suitable for each particular media flow. The decompressed and reconstructed media flows are supplied to a playback unit 120 where the media flows are rendered at a correct pace according to their synchronization data and supplied to presentation means 124. The actual presentation means 124 may comprise for example a computer or mobile station display, and loudspeaker means. The client 114 also typically comprises a control unit 122 that the end user can typically control through a user interface and that controls both the operation of the server, through the above-described control protocol, and the operation of the playback unit 120, on the basis of the instructions given by the end user.

It is to be noted that the transfer of multimedia files from the streaming server 112 to the client 114 takes place through a telecommunications network, the transfer path typically comprising a plural number of telecommunications network elements. It is therefore possible that there is at least some network element that can carry out traffic shaping of multimedia data with regard to the available bandwidth or the maximum decoding and playback rate of the client 114 at least partly in the same way as described above in connection with the streaming server.

Figure 2:
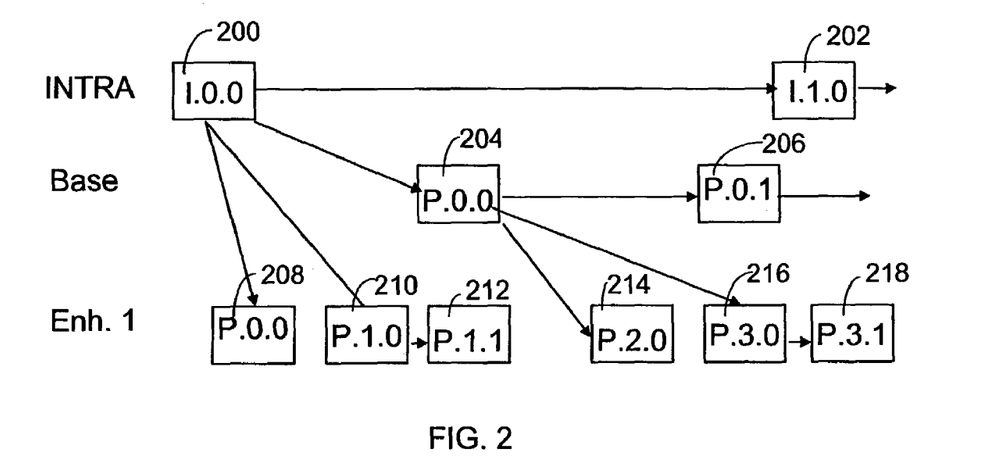
FIG. 2 illustrates a scalable coding hierarchy of a preferred embodiment of the invention.

Scalable coding will be described below with reference to a preferred embodiment of the invention and an example illustrated in FIG. 2. FIG. 2 shows part of a compressed video sequence having a first frame 200, which is an INTRA frame, or I-frame, and thus an independently determined video frame the image information of which is determined without using motion-compensated temporal prediction. The I-frame 200 is placed on a first scalability layer, which may be referred to as an INTRA layer. Each scalability layer is assigned a unique identifier, such as the layer number. The INTRA layer may therefore be given the number 0, for example, or some other alphanumeric identifier, for example a letter, or a combination of a letter and a number.

Correspondingly, sub-sequences consisting of groups of one or more video frames are determined for each scalability layer, at least one of the images in a group (typically the first or the last one) being temporally predicted at least from a video frame of another, sub-sequence of typically either a higher or the same scalability layer, the rest of the video frames being temporally predicted either from only the video frames of the same sub-sequence, or possibly also from one or more video frames of said second sub-sequence. A sub-sequence may de decoded independently, irrespective of other sub-sequences, except said second sub-sequence. The sub-sequences of each scalability layer are assigned a unique identifier using for example consecutive numbering starting with number 0 given for the first sub-sequence of a scalability layer. Since the I-frame 200 is determined independently and can also be decoded independently upon reception, irrespective of other image frames, it also forms in a way a separate sub-sequence.

An essential aspect of the present invention is therefore to determine each sub-sequence in terms of those sub-sequences the sub-sequence is dependent on. In other words, a sub-sequence comprises information about all the sub-sequences that have been directly used for predicting the image frames of the sub-sequence in question. This information is signalled in a video sequence bit stream, preferably separate from the actual image information, and therefore the image data of the video sequence can be preferably adjusted because it is easy to determine video sequence portions that are to be independently decoded and can be removed without affecting the decoding of the rest of the image data.

Next, within each sub-sequence, the video frames of the sub-sequence are given image numbers, using for example consecutive numbering that starts with the number 0 given to the first video frame of the sub-sequence. Since the I-frame 200 also forms a separate sub-sequence, its image number is 0. In FIG. 2, the I-frame 200 shows the type (I), sub-sequence identifier and image number (0.0) of the frame.

FIG. 2 further shows a next I-frame 202 of the INTRA layer, the frame thus being also an independently determined video frame that has been determined without using motion-compensated temporal prediction. The temporal transmission frequency of I-frames depends on many factors relating to video coding, image information contents and the bandwidth to be used, and, depending on the application or application environment, I-frames are transmitted in a video sequence at intervals of 0.5 to 10 seconds, for example. Since the I-frame 202 can be independently decoded, it also forms a separate sub-sequence. Since this is the second sub-sequence in the INTRA-layer, the consecutive numbering of the sub-sequence identifier of the I-frame 202 is 1. Further, since the I-frame 202 also forms a separate sub-sequence, i.e. it is the only video frame in the sub-sequence, its image number is 0. The I-frame 202 can thus be designated with identifier (1.1.0.) Correspondingly, the identifier of the next I-frame on the INTRA layer is (1.2.0.), etc. As a result, only independently determined I-frames in which the image information is not determined using motion-compensated temporal prediction are coded into the first scalability layer, i.e. the INTRA layer. The sub-sequences can also be determined using other kind of numbering or other identifiers, provided that the sub-sequences can be distinguished from one another.

The next scalability layer, which has a layer number 1, for example, and which may be referred to as the base layer, comprises coded, motion-compensated INTER or P-frames typically predicted only from previous image frames, i.e. in this case from the I-frames of an upper INTRA layer. The image information of the first P-frame 204 of the base layer shown in FIG. 2 is determined using the I-frame 200 of the INTRA layer. A P-frame 204 begins the first sub-sequence of the base layer, and therefore the sub-sequence identifier of the P-frame 204 is 0. Further, since the P-frame 204 is the first image frame of the first sub-sequence of the base layer, the image number of the P-frame 204 is 0. The P-frame 204 can thus be identified with (P.0.0).

The temporally succeeding P-frame 206 of the base layer is predicted from the previous P-frame 204. The P-frames 204 and 206 thus belong to the same sub-sequence, whereby the P-frame 206 also receives the sub-sequence identifier 0. Since the P-frame 206 is the second image frame in the sub-sequence 0, the image number of the P-frame 206 is 1, and the P-frame 206 can be identified with (P.0.1).

The scalability layer succeeding the base layer and having the layer number 2, is called enhancement layer 1. This layer comprises coded, motion-compensated P-frames predicted only from previous image frames, in this case either from I-frames of the INTRA layer or P-frames of the base layer. FIG. 2 shows a first image frame 208 and a second image frame 210 of enhancement layer 1, which are both predicted only from the first image frame 200 of the INTRA layer. The P-frame 208 begins the first sub-sequence of enhancement layer 1, the sub-sequence identifier of the P-frame thus being 0. Further, since the P-frame 208 is the first and only image frame in said sub-sequence, the P-frame 208 receives the image number 0. The P-frame 208 can thus be identified with (P.0.0.).

Since the second image frame 210 is also predicted only from the first image frame 200 of the INTRA layer, the P-frame 210 begins the second sub-sequence of enhancement layer 1 and the sub-sequence identifier of the P-frame 210 is therefore 1. Since the P-frame 210 is the first image frame in the sub-sequence, the image number of the P-frame 210 is 0. The P-frame can thus be identified with (P.1.0.). The temporally succeeding P-frame 212 of enhancement layer 1 is predicted from the previous P-frame 210. The P-frames 210 and 212 thus belong to the same sub-sequence, and therefore the P-frame also receives the sub-sequence identifier 1. The P-frame 212 is the second image frame in the sub-sequence 1, and therefore the P-frame receives the image number 1 and can be identified with (P.1.1).

The temporally fourth image frame 214 of enhancement layer 1 is predicted from the first image frame 204 of the base layer. The P-frame 214 thus begins a third sub-sequence of enhancement layer 1 and therefore the P-frame 214 receives the sub-sequence identifier 2. Further, since the P-frame 214 is the first and only image frame in the sub-sequence, the image number of the P-frame 214 is 0. The P-frame 208 can therefore be identified with (P.2.0).

Also the temporally fifth image frame 216 of enhancement layer 1 is predicted only from the first image frame 204 of the base layer, the P-frame 216 thus beginning the fourth sub-sequence of enhancement layer 1, and the sub-sequence identifier of the P-frame 216 is 3. In addition, since the P-frame 216 is the first one in the sub-sequence in question, the image number of the P-frame 216 is 0. The P-frame 216 can therefore be identified with (P.3.0). The temporally following P-frame 218 of enhancement layer 1 is predicted from the previous P-frame 216. The P-frames 216 and 218 thus belong to the same sub-sequence, and the sub-sequence identifier of the P-frame 218 is also 3. Since the P-frame 218 is the second image frame in the sub-sequence 3, the image number of the P-frame 218 is 1 and the identifier of the P-frame 218 is (P.3.1).

For simplicity and clarity of illustration the above disclosure only relates to I- and P-frames. However, a person skilled in the art will find it apparent that the scalable video coding of the invention can also be implemented using other known image frame types, such as the above described B-frames and at least SI-frames, SP-frames and MH-frames. SI-frames correspond to I-frames, but together with an SP-frame they allow an identical image to be reconstructed. An SP-frame, in turn, is a P-frame subjected to a particular coding that allows an identical image to be reconstructed together with an SI-frame or another SP-frame. SP-frames are typically placed into a video sequence into points where an access point or a scanning point is desired, or where the changing of the coding parameters of the video stream should be possible. The frames can also be used for error correction and for increasing error tolerance. SP-frames are otherwise similar to ordinary P-frames predicted from previous frames, except that they are defined so that they can be replaced by another video frame of the SP- or SI-type, the result of the decoding of the new frame being identical with the decoding result of the original SP-frame that was in the video stream. In other words, a new SP-frame that is used for replacing the one that was in the video stream is predicted from another sequence or video stream and yet the reconstructed frame has identical contents. SP-frames are described for example in the Applicant's earlier application PCT/F102/00004.

Similarly as B-frames, macroblocks of MH (Multi Hypothesis) frames, based on motion-compensated prediction, are predicted from two other frames, which are not, however, necessarily located next to an MH-frame. More precisely, the predicted macroblocks are computed as an average of two macroblocks of two other frames. Instead of two frames, MH-frame macroblocks can naturally be also predicted from one other frame. Reference images may change according to macroblock, in other words, all macroblocks in one and the same image are not necessarily predicted using the same frames.

A sub-sequence thus covers a specific period of time in a video sequence. The sub-sequences of the same layer or of different layers may be partly or entirely overlapping. If there are temporally overlapping image frames on the same layer, the frames are interpreted as alternative presentations of the same image content and therefore any mode of image presentation can be used. On the other hand, if there are temporally overlapping image frames on different layers, they form different presentations of the same image content, and therefore presentations differ in image quality; i.e. the quality of image is better on a lower layer.

The above disclosure referring to FIG. 2 illustrates a scalable coding arrangement and a hierarchical structure and numbering of image frames according to a preferred embodiment of the invention. In this embodiment the INTRA-layer only comprises I-frames and the base layer can only be decoded using the information received from the INTRA-layer. Correspondingly, the decoding of enhancement layer 1 typically requires information from both the base layer and the INTRA-layer.

The number of the scalability layers is not restricted to three, as above, but any number of enhancement layers that is considered necessary for producing sufficient scalability may be used. Consequently, the layer number of enhancement layer 2 is four, that of enhancement layer 3 is five, etc. Since some of the image frames in the above example are given the same identifier (e.g. the identifier of both image frames 204 and 208 is (P.0.0)), by including the layer number in the identifier each image frame can be uniquely identified and, at the same time, the dependencies of each image frame on other image frames is preferably determined. Each image frame is thus uniquely identified, the identifier of image frame 204, for example, being (P.1.0.0), or simply (1.0.0) and, correspondingly, that of image 208 being (P.2.0.0), or (2.0.0).

According to a preferred embodiment of the invention, the number of a reference image frame is determined according to a specific, predetermined alpha-numeric series, for example as an integer between 0 and 255. When the parameter value achieves the maximum value N (e.g. 255) in the series concerned, the determining of the parameter value starts from the beginning, i.e. from the minimum value of the series (e.g. 0). An image frame is thus uniquely identified within a specific sub-sequence up to the point where the same image number is used again. The sub-sequence identifier can also be determined according to a specific, predetermined arithmetic series. When the value of the sub-sequence identifier achieves the maximum value N of the series, the determining of the identifier starts again from the beginning of the series. However, a sub-sequence cannot be assigned an identifier that is still in use (within the same layer). The series in use may also be determined in another way than arithmetically. One alternative is to assign random sub-sequence identifiers, taking into account that an assigned identifier is not be used again.

A problem in the numbering of image frames arises when the user wishes to start browsing a video file in the middle of a video sequence. Such situations occur for example when the user wishes to browse a locally stored video file backward or forward or to browse a streaming file at a particular point; when the user initiates the playback of a streaming file from a random point; or when a video file that is to be reproduced is detected to contain an error that interrupts the playback or requires the playback to be resumed from a point following the error. When the browsing of a video file is resumed from a random point after previous browsing, discontinuity typically occurs in the image numbering. The decoder typically interprets this as unintentional loss of image frames and unnecessarily tries to reconstruct the image frames suspected as lost.

According to a preferred embodiment of the invention, this can be avoided in the decoder by defining an initiation image in an independently decodable Group of Pictures GOP that is activated at the random point of the video file, and the number of the initiation image is set at zero. This independently decodable image group can thus be a sub-sequence of an INTRA-layer, for example, in which case an I-frame is used as the initiation image, or, if scaling originating from the base layer is employed, the independently decodable image group is a sub-sequence of the base layer, in which case the first image frame of the sub-sequence, typically an I-frame, is usually used as the initiation image. Consequently, when activated at a random point, the decoder preferably sets the identifier of the first image frame, preferably an I-frame, of the independently decodable sub-sequence at zero. Since the sub-sequence to be decoded may also comprise other image frames whose identifier is zero (for example when the above described alpha-numeric series starts from the beginning), the beginning of the sub-sequence, i.e. its first image frame, can be indicated to the decoder for example by a separate flag added to the header field of a slice of the image frame. This allows the decoder to interpret the image numbers correctly and to find the correct image frame that initiates the sub-sequence from the video sequence image frames.

The above numbering system provides only one example of how the unique image frame identification of the invention can be carried out so that interdependencies between the image frames are indicated at the same time. However, video coding methods in which the method of the invention can be applied, such as video coding methods according to the ITU-T standards H.263 and H.26L, employ code tables, which in turn use variable length codes. When variable length codes are used for coding layer numbers, for example, a lower code word index, i.e. a smaller layer number, signifies a shorter code word. In practice the scalable coding of the invention will be used in most cases in such a way that the base layer will consist significantly more image frames than the INTRA-layer. This justifies the use of a lower index, i.e. a smaller layer number, on the base layer than on the INTRA-layer, because the amount of coded video data is thereby advantageously reduced. Consequently, the INTRA-layer is preferably assigned layer number 1 and the base layer is given layer number 0. Alternatively, the code can be formed by using fewer bits for coding the base layer number than the INTRA-layer number, in which case the actual layer number value is not relevant in view of the length of the code created.

Further, according to a second preferred embodiment of the invention, when the number of the scalability layers is to be kept low, the first scalability layer in particular can be coded to comprise both the INTRA-layer and the base layer. From the point of view of coding hierarchy, the simplest way to conceive this is to leave out the INTRA-layer altogether, and to provide the base layer with coded frames consisting of both independently defined I-frames, the image information of which has not been determined using motion-compensated temporal prediction, and image frames predicted from previous frames, which image frames in this case are motion-compensated P-frames predicted from the I-frames of the same layer. The layer number 0 can thus still be used for the base layer and, if enhancement layers are coded into the video sequence, enhancement layer 1 is assigned layer number 1. This is illustrated in the following, with reference to FIGS. 3*a* and 3*b*.

Figure 3A:
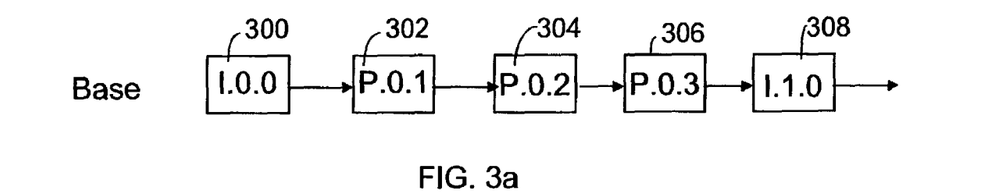
FIGS. 3a and 3b illustrate embodiments of the invention for adjusting scalability.

FIG. 3*a* shows a non-scalable video sequence structure, in which all image frames are placed on the same scalability layer, i.e. the base layer. The video sequence comprises a first image frame 300 which is an I-frame (1.0.0) and which thus initiates a first sub-sequence. The image frame 300 is used for predicting a second image frame 302 of the sub-sequence, i.e. a P-frame (P.0.1), which is then used for predicting a third image frame 304 of the sub-sequence, i.e. a P-frame (P.0.2), which is in turn used for predicting the next image frame 306, i.e. a P-frame (P.0.3). The video sequence is then provided with an I-frame (1.1.0) coded therein, i.e. an I-frame 308, which thus initiates a second sub-sequence in the video sequence. This kind of non-scalable coding can be used for example when the application employed does not allow scalable coding to be used, or there is no need for it. In a circuit-switched videophone application, for example, channel bandwidth remains constant and the video sequence is coded in real-time, and therefore there is typically no need for scalable coding.

Figure 3B:
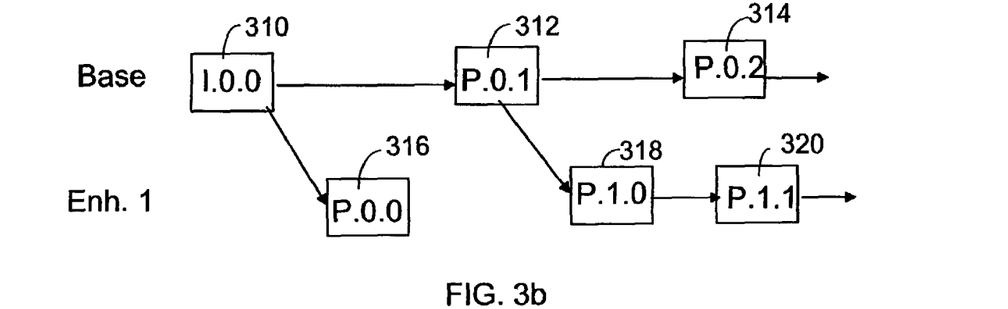

FIG. 3*b*, in turn, illustrates an example of how scalability can be added, when necessary, to a combined INTRA- and base layer. Here, too, the video sequence base layer comprises a first image frame 310 which is an I-frame (1.0.0) and which initiates a first sub-sequence of the base layer. The image frame 310 is used for predicting a second image frame 312 of the sub-sequence, i.e. a P-frame (P.0.1), which is then used for predicting a third image frame 314 of the sub-sequence, i.e. a P-frame (P.0.2). Enhancement layer 1, however, is also coded into this video sequence and it comprises a first sub-sequence, the first and only image frame 316 of which is a P-frame (P.0.0), which is predicted from the first image frame 310 of the base layer. The first image frame 318 of a second sub-sequence of the enhancement layer is, in turn, predicted from the second image frame 312 of the base layer, and therefore the identifier of this P-frame is (P.1.0). The next image frame 320 of the enhancement layer is again predicted from the previous image frame 318 of the same layer and, therefore, it belongs to the same sub-sequence, its identifier thus being (P.1.1).

In this embodiment of the invention the sub-sequences of the base layer can be decoded independently, although a base layer sub-sequence may be dependent on another base layer sub-sequence. The decoding of the base layer sub-sequences requires information from the base layer and/or from the second sub-sequence of enhancement layer 1, the decoding of the sub-sequences of enhancement layer 2 requires information from enhancement layer 1 and/or from the second sub-sequence of enhancement layer 2, etc. According to an embodiment, I-frames are not restricted to the base layer alone, but lower enhancement layers may also comprise I-frames.

The basic idea behind the above embodiments is that a sub-sequence comprises information about all the sub-sequences it is dependent on, i.e. about all sub-sequences that have been used for predicting at least one of the image frames of the sub-sequence in question. However, according to an embodiment it is also possible that a sub-sequence comprises information about all sub-sequences that are dependent on the sub-sequence in question, in other words, about all the sub-sequences in which at least one image frame has been predicted using at least one image frame of the sub-sequence in question. Since in the latter case the dependencies are typically determined temporally forward, image frame buffers can be advantageously utilized in the coding in a manner to be described later.

In all the above embodiments the numbering of the image frames is sub-sequence-specific, i.e. a new sub-sequence always starts the numbering from the beginning. The identification of an individual image frame thus requires the layer number, sub-sequence identifier and image frame number to be determined. According to a preferred embodiment of the invention, the image frames can be independently numbered using consecutive numbering in which successive reference image frames in the coding order are indicated with numbers incremented by one. As regards layer numbers and sub-sequence identifiers, the above-described numbering procedure can be used. This allows each image frame to be uniquely identified, when necessary, without using the layer number and sub-sequence identifier.

Figure 4A:
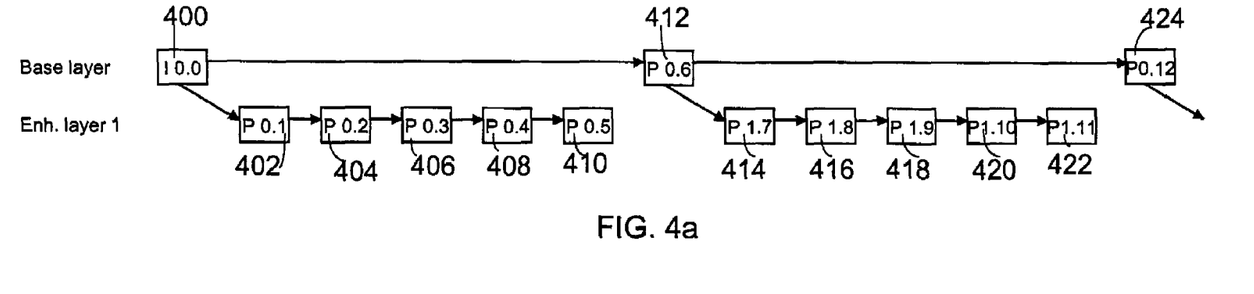
FIGS. 4a, 4b and 4c illustrate embodiments of the invention for adjusting image numbering.

This is illustrated with the example shown in FIG. 4a in which the base layer comprises a temporally first I-frame 400 (1.0.0). This frame is used for predicting a first image frame 402 of enhancement layer 1, i.e. (P.0.1), which is then used for predicting a second image frame 404 belonging to the same sub-sequence (with sub-sequence identifier 0), i.e. (P.0.2), which is used for predicting a third image frame 406 of the same sub-sequence, i.e. (P.0.3), which is used for predicting a fourth image frame 408 (P.0.4) and, finally, the fourth frame for predicting a fifth image frame 410 (P.0.5). The temporally next video sequence image frame 412 is located on the base layer, where it is in the same sub-sequence as the I-frame 400, although temporally it is only the seventh coded image frame, and therefore its identifier is (P.0.6). The seventh frame is then used for predicting a first image frame 414 of the second sub-sequence of enhancement layer 1, i.e. (P.1.7), which is then used for predicting a second image frame 416 belonging to the same sub-sequence (with sub-sequence identifier 1), i.e. (P.1.8), which in turn used for predicting a third image frame 418 (P.1.9), the third for predicting a fourth image frame 420 (P.1.10) and, finally, the fourth for predicting a fifth image frame 422 (P.1.11) of the same sub-sequence. Again, the temporally next video sequence image frame 424 is located on the base layer, where it is in the same sub-sequence as the I-frame 400 and the P-frame 412, although temporally it is only the thirteenth coded image frame and therefore its identifier is (P.0.12). For clarity of illustration, the above description of the embodiment does not comprise layer identifiers, but it is apparent that in order to implement scalability, also the layer identifier must be signalled together with the video sequence, typically as part of the image frame identifiers.

Figure 4B:
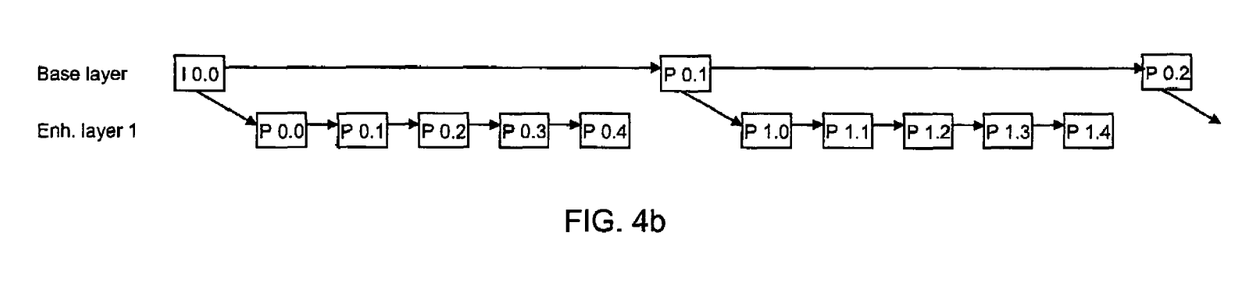
Figure 4C:
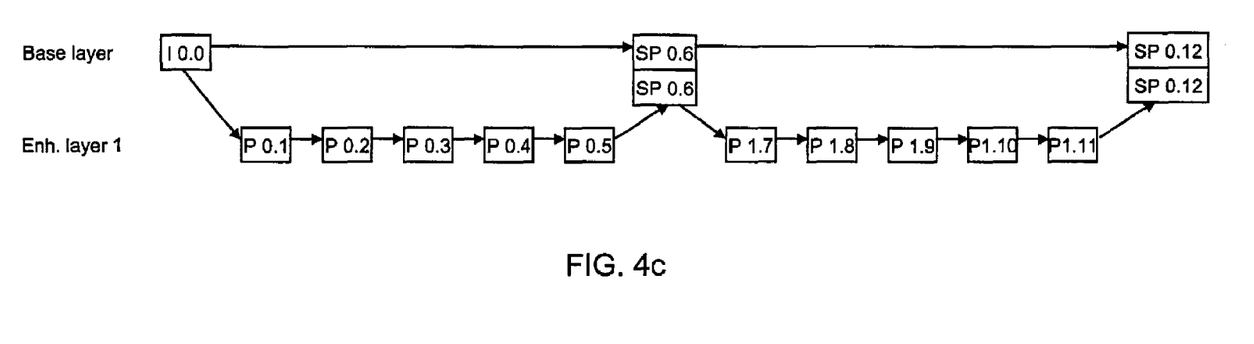

FIGS. 4b and 4c show alternative embodiments for grouping the image frames of the video sequence shown in FIG. 4a. The image frames in FIG. 4b are numbered according to sub-sequence, i.e. a new sub-sequence always starts the numbering from the beginning (from zero). FIG. 4c, in turn, employs image frame numbering which corresponds otherwise to that used in FIG. 4a, except that the P-frames of the base layer are replaced by SP-frame pairs to allow for identical reconstruction of image information.

Figure 5A:
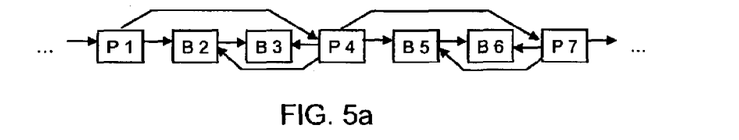
FIGS. 5a, 5b and 5c illustrate embodiments of the invention for using B-frames in a scalable coding hierarchy.
Figure 5B:
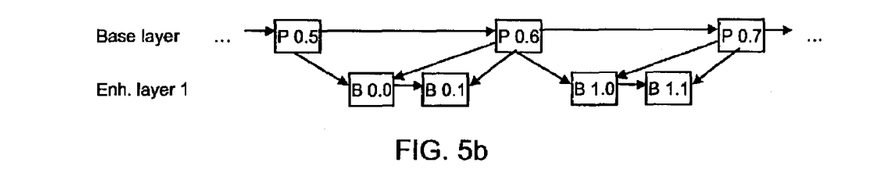
Figure 5C:
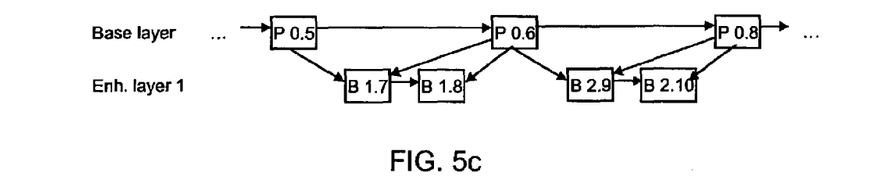

As stated above, the procedure of the invention can also be implemented using B-frames. One example of this is illustrated in FIGS. 5a, 5b and 5c. FIG. 5a shows a video sequence in the time domain, the sequence comprising P-frames P1, P4 and P7, with B-frames placed between them, the interdependencies of the B-frames with regard to temporal predicting being shown with arrows. FIG. 5b shows a preferred grouping of video sequence image frames in which the interdependencies shown in FIG. 5a are indicated. FIG. 5b illustrates sub-sequence-specific image frame numbering in which a new sub-sequence always starts the numbering of the image frames from zero. FIG. 5c, in turn, illustrates image frame numbering, which is consecutive in the order of temporal prediction, wherein the following reference frame always receives the next image number as the previously encoded reference frame. The image frame (B1.8) (and (B2.10)) does not serve as a reference prediction frame to any other frame, therefore it does not affect the image frame numbering.

The above examples illustrate different alternatives of how scalability of video sequence coding can be adjusted by using the method of the invention. From the point of view of the terminal device reproducing the video sequence, the more scalability layers are available, or the more scalability layers it is capable of decoding, the better the image quality. In other words, increase in the amount of image information and in the bit rate used for transferring the information improves the temporal or spatial resolution, or the spatial quality of the image data. Correspondingly, a higher number of scalability layers also sets considerably higher demands on the processing capacity of the terminal device performing decoding.

In addition, the above examples illustrate the advantage gained by using sub-sequences. With image frame identifiers, the dependencies of each image frame from other image frames in the sub-sequence are indicated in an unambiguous manner. A sub-sequence thus forms an independent whole that can be left out of a video sequence, when necessary, without affecting the decoding of subsequent image frames of the video sequence. In that case, only the image frames of the sub-sequence in question and of those sub-sequences on the same and/or lower scalability layers dependent on it are not decoded.

The image frame identifier data transmitted together with the video sequence are preferably included in the video sequence header fields or in the header fields of the transfer protocol to be used for transferring the video sequence. In other words, the identifier data of predicted image frames are not included in the image data of the coded video sequence, but always into the header fields, whereby the dependencies of the image frames can be detected without decoding the images of the actual video sequence. The identifier data of the image frames can be stored for example in the buffer memory of the streaming server as the video sequence is being coded for transmission. In addition, the sub-sequences can be independently decoded on each scalability layer, because the image frames of a sub-sequence are not dependent on other sub-sequences of the same scalability layer.

According to an embodiment of the invention, the image frames comprised by a sub-sequence may thus depend also on other sub-sequences of the same scalability layer. This dependency must then be signalled for example to the streaming server carrying out traffic shaping, because interdependent sub-sequences located on the same layer cannot be separately removed from a video sequence to be transmitted. A preferred way to carry out the signalling is to include it in the image frame identifiers to be transmitted, for example by listing the layer-sub-sequence pairs the sub-sequence in question depends on. This also provides a preferred way of indicating dependency from another sub-sequence of the same scalability layer.

Figure 6A:
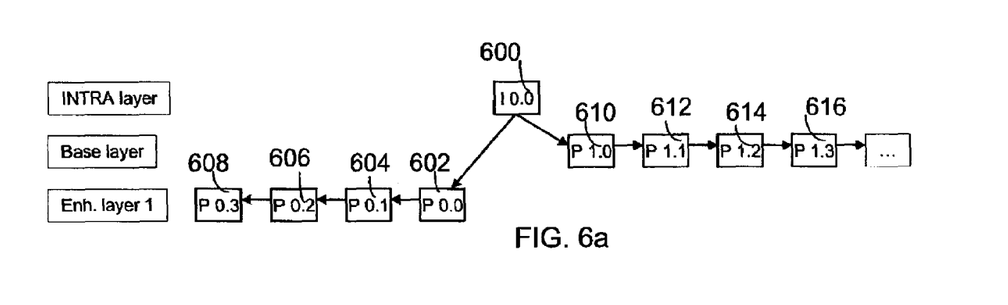
FIGS. 6a, 6b and 6c illustrate scalable coding hierarchies of preferred embodiments of the invention in connection with reference picture selection.
Figure 6B:
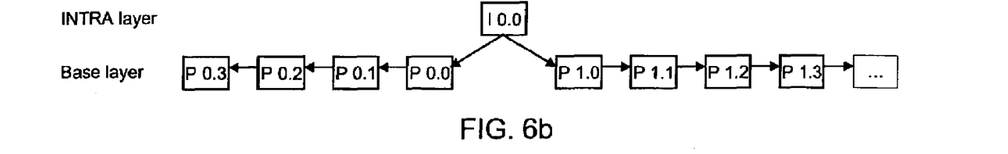
Figure 6C:
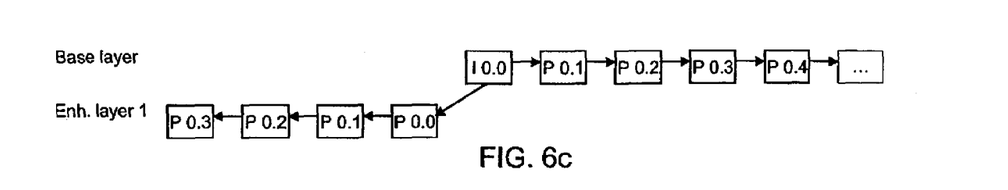

The above examples illustrate a situation where image frames are temporally predicted from previous image frames. In some coding methods, however, the reference picture selection has been further extended to also include the predicting of the image information of image frames from temporally succeeding image frames. Reference picture selection offers most diversified means for creating different temporally scalable image frame structures and allows the error sensitivity of the video sequence to be reduced. One of the coding techniques based on reference picture selection is INTRA-frame postponement. The INTRA-frame is not placed into its temporally "correct" position in the video sequence, but its position is temporally postponed. The video sequence image frames that are between the "correct" position of the INTRA-frame and its actual position are predicted temporally backward from the INTRA-frame in question. This naturally requires that uncoded image frames be buffered for a sufficiently long period of time so that all image frames that are to be displayed can be coded and arranged into their order of presentation. INTRA-frame transfer and the associated determining of sub-sequences in accordance with the invention are illustrated in the following with reference to FIG. 6.

FIG. 6a shows a video sequence part in which the INTRA-frame comprises a single I-frame 600, which is temporally transferred to the position shown in FIG. 6, although the "correct" position of the I-frame in the video sequence would have been at the first image frame. The video sequence image frames between the "correct" position and the real position 600 are thus temporally predicted backward from the I-frame 600. This is illustrated by a sub-sequence coded into enhancement layer 1 and having a first temporally backward predicted image frame 602, which is a P-frame (P.0.0). This frame is used for temporally predicting a previous image frame 604, i.e. a P-frame (P.0.1), which is used in turn for predicting an image frame 606, i.e. a P-frame (P.0.2), and, finally, the frame 606 for predicting an image frame 608, i.e. a P-frame (P.0.3), which is at the position that would have been the "correct" position of the I-frame 600 in the video sequence. Correspondingly, the I-frame 600 on the base layer is used for temporally forward prediction of a sub-sequence comprising four P-frames 610, 612, 614 and 616, i.e. P-frames (P.0.0), (P.0.1), (P.0.2) and (P.0.3).

The fact that in this example backward predicted image frames are placed on a lower layer than forward predicted image layers indicates that for purposes of illustration, backward predicted image frames are in this coding example considered subjectively less valuable than forward predicted image frames. Naturally the sub-sequences could both be placed on the same layer, in which case they would be considered equal, or a backward predicted sub-sequence could be on the upper layer, in which case it would be considered subjectively more valuable.

FIGS. 6b and 6c show some alternatives for coding a video sequence according to FIG. 6a. In FIG. 6b both forward and backward predicted sub-sequences are placed on the base layer, the I-frame being only located on the INTRA-layer. The forward predicted sub-sequence on this layer is thus the second sub-sequence and its sub-sequence identifier is 1. In FIG. 6c, in turn, an I-frame and a forward predicted sub-sequence based on it are located on the base layer, while a backward predicted sub-sequence is located on enhancement layer 1.

Moreover, according to a preferred embodiment of the invention, the above-described scalability can be utilized for coding what is known as a scene transition into a video sequence. Video material, such as news reports, music videos and movie trailers, often comprise rapid cuts between separate image material scenes. Sometimes the cuts are abrupt, but often a procedure known as scene transition is used in which transfer from one scene to another takes place by dimming, wiping, mosaic dissolving or scrolling the image frames of a previous scene, and, correspondingly, by presenting those of a later scene. From the point of view of coding efficiency, the video coding of a scene transition is often most problematic, because the image frames appearing during the scene transition comprise information on the image frames of both the terminating and the initiating scene.

A typical scene transition, fading, is carried out by gradually reducing the intensity or luminance of the image frames of a first scene to zero, while gradually increasing the intensity of the image frames of a second scene to its maximum value. This scene transition is referred to as cross-faded scene transition.

Generally speaking, a computer-made image can be thought of as consisting of layers, or image objects. Each object can be defined with reference to at least three information types: the structure of the image object, its shape and transparency, and the layering order (depth) in relation to the background of the image and to other image objects. Shape and transparency are often determined using what is known as an alpha plane, which measures opacity and the value of which is usually determined separately for each image object, possibly excluding the background, which is usually determined as non-transparent. The alpha plane value of a non-transparent image object, such as the background, can thus be set at 1.0, whereas the alpha plane value of a fully transparent image object is 0.0. The values in between define the intensity of the visibility of a specific image object in a picture in proportion to the background and to other, at least partly overlapping, image objects that have a higher depth value than the image object in question.

The superimposition of image objects in layers according to their shape, transparency and depth position is referred to as scene composition. In practice the procedure is based on the use of weighted averages. First, the image object that is closest to the background, i.e. deepest according to its depth position, is placed onto the background and a combined image is formed of the two. The pixel values of the combined image are formed as an average weighted by the alpha plane values of the background image and the image object in question. The alpha plane value of the combined image is then set at 1.0, after which it serves as a background image for the next image object. The process continues until all image objects are attached to the image.

In the following, a procedure according to a preferred embodiment of the invention will be described in which video sequence scalability layers are combined with the above described image objects of image frames and their information types to provide a scene transition with scalable video coding that also has good compression efficiency.

This embodiment of the invention is illustrated in the following by way of example and in a simplified manner by using cross-faded scene transition, on one hand, and abrupt scene transition, on the other hand, as examples. The image frames to be displayed during a scene transition are typically formed of two superimposed image frames, a first image frame comprising a first image scene and a second image frame a second scene. One of the image frames serves as the background image and other, which is referred to as a foreground image, is placed on top of the background image. The opacity of the background image, i.e. its non-transparency value, is constant. In other words, its pixel-specific alpha plane values are not adjusted.

Figure 7:
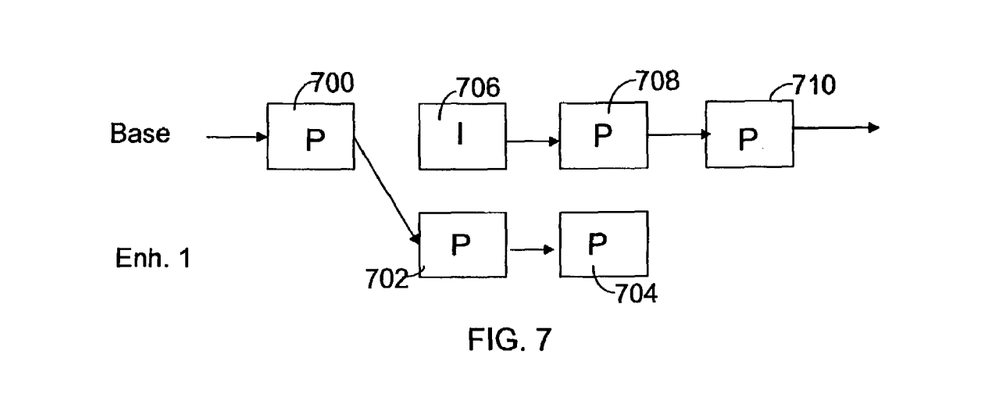
FIG. 7 illustrates an arrangement according to a preferred embodiment of the invention for coding scene transition.

In this embodiment of the invention, the background and foreground images are both defined according to scalability layer. This is illustrated in FIG. 7, which shows an example of how image frames of two different scenes can be placed on scalability layers during a scene transition of the invention. FIG. 7 shows a first image frame 700 of a first (terminating) scene positioned on the base layer. The image frame 700 may be either an I-frame containing image information that has not been determined using motion-compensated temporal predicting, or it may be a P-frame that is a motion-compensated image frame predicted from previous image frames. The coding of a second (initiating) scene starts during the temporally following image frame and, according to the invention, the image frames of the scene are also placed on the base layer. Remaining image frames 702, 704 of the second (terminating) scene are then placed on enhancement layer 1. These image frames are typically P-frames.

In this embodiment, the image frames of the second (initiating) scene are thus placed on the base layer, at least for the duration of the scene transition. The first image frame 706 of the scene is typically an I-frame, and it is used for temporally predicting the succeeding image frames of the scene. Consequently, the succeeding image frames of the second scene are temporally predicted frames, typically P-frames, such as frames 708 and 710 shown in FIG. 7.

According to a preferred embodiment of the invention, this placing of image frames on scalability layers can be used for implementing a cross-faded scene transition by determining the image layer that is on the base layer always as a background image of maximum opacity (100%), or non-transparency value. During a scene transition, image frames located on enhancement layers are placed onto the background image and their opacity is adjusted for example by means of suitable filters such that the frames gradually change from non-transparent to transparent.

In the video sequence of FIG. 7, there are no image frames on the lower scalability layers during the first base layer image frame 700. For this time instant, the first image frame 700 is only coded into the video sequence.

The next image frame 706 of the base layer initiates a new (second) scene, during which the image frame 706 is provided with depth positioning that places it as the background image, and its opacity value is set to the maximum. Temporally simultaneously with the image frame 706 of the base layer, there is an image frame 702 of a terminating (first) scene on enhancement layer 1. To allow a cross-faded scene transition to be produced, the transparency of the frame 702 must be increased. The example of FIG. 7 assumes that the opacity of the image frame 702 is set at 67% and, in addition, the image frame 702 is provided with depth positioning that determines it as a foreground image. For this time instant, an image combining the image frames 706 and 702 is coded into the video sequence, image 706 being visible as a weaker image on the background and image 702 as a stronger image at the front, because its opacity value is essentially high (67%).

During the temporally following image frame, there is a second image frame 708 of the second scene on the base layer, the frame 708 being thus correspondingly provided with depth positioning determining it as a background image, and its opacity value is set to the maximum. Enhancement layer 1 further comprises the last image frame 704 of a temporally simultaneously terminating (first) scene, the opacity value of the frame being set at 33% and, in addition, the image frame 704 being provided with depth positioning that determines it as a foreground image as well. Consequently, for this time instant, an image combined of the image frames 708 and 704 is coded into the video sequence, the image 708 being displayed as a stronger image on the background and the image 704 as a weaker image on the foreground, because the opacity value of the image 704 is no longer more than 33%.

During the temporally following image frame, the base layer comprises a third image frame 710 of the second scene. Since the first scene has terminated, only the image frame 710 is coded into the video sequence, and the displaying of the second scene continues from the frame 710.

The above disclosure describes, by way of example, the positioning of image frames according to the invention on scalability layers to implement cross-faded scene transition in a manner that is advantageous from the point of view of coding efficiency. However, it is possible that when a video sequence is being transmitted or decoded, a situation arises in which the bit rate of the video sequence must be adjusted according to the maximum value of the bandwidth and/or terminal device decoding rate available for data transfer. This kind of bit rate control causes problems when the scene transition is to be implemented using prior art video coding methods.

A preferred embodiment of the present invention now allows one or more scalability layers, or independently decodable sub-sequences included in them, to be removed from a video sequence, whereby the bit rate of the video sequence can be decreased and yet, at the same time, the video sequence can be decoded without reducing image frequency. In the image frame positioning according to FIG. 7, this can be implemented by removing enhancement layer 1 from the video sequence. The video sequence is thus only used for displaying the image frames 700, 706, 708 and 710 of the base layer. In other words, a direct transition from the first (terminating) scene to the second (initiating) scene takes place in the form of an abrupt scene transition, i.e. directly from the image frame 700 of the first scene into the I-image frame 706 that initiates the second scene. The transition is thus not a cross-faded scene transition but an abrupt scene transition. Nevertheless, the scene transition can be carried out in an advantageous manner without affecting the quality of the video sequence image, and the viewer usually does not experience an abrupt scene transition carried out instead of a cross-faded scene transition in any way disturbing or faulty. On the contrary, since the prior art implementation does not allow scalability layers to be removed, scene transition would often require image frequency to be reduced, which the viewer would find jerky and disturbing.

The invention thus provides a preferred means for carrying out multimedia data traffic shaping in a streaming server comprising information about the different sub-sequences of a video sequence: their average bit rate, location in relation to the entire video sequence, duration and their interdependencies regarding the layers. The streaming server also determines the maximum value of the bandwidth available for the data transfer and/or the decoding rate of the terminal device. On the basis of this information, the streaming server decides how many scalability layers and which sub-sequences are transmitted in the video sequence. Bit rate control can thus be carried out, when necessary, by making first a rough adjustment of the number of the scalability layers, after which finer sub-sequence-specific adjustment can be easily carried out. At its simplest, bit rate control means making sub-sequence-specific decisions on whether a particular sub-sequence will be added to a video sequence or removed from it. In case of removal it is advisable to remove entire sub-sequences from a video sequence, because the removal of separate images may cause errors in other images of the same sub-sequence. For the same reason, all sub-sequences of a lower enhancement layer should be left out if they are dependent on the removed sub-sequence of a higher layer. If there are interdependent sub-sequences on one and the same scalability layer, sub-sequences dependent on an earlier sub-sequence must be removed if the earlier sub-sequence is removed.

If the image frame identifier data are added to a video sequence that is to be transmitted, traffic shaping can also be carried out in a telecommunications network element to be used for the transfer of the video sequence, for example in an Internet router, in different gateways, or at a base station or base station controller of a mobile communications network. For the network element to be able to maintain and process the sub-sequence information, it must have extra memory and processing capacity. For this reason traffic shaping that is to be carried out in the network is perhaps most probably executed using simple processing methods, such as the DiffServ, i.e. differentiated services, procedure that is supported by some IP-based networks. In the DiffServ method, each IP data packet is assigned a priority, whereby data packets of a higher priority are relayed faster and more reliably to the recipient than packets of a lower priority. This is advantageously applied to the scalability of the invention by determining not only scalability-layer-specific, but also sub-sequence-specific priorities, which enables a highly advanced priorisation.

There are many alternatives for adding image frame identifier data to a video sequence that is to be transmitted. In addition, it is also possible not to include any identifier data into the video sequence, in which case traffic shaping is only carried out at the streaming server. The identifier data can be included in the header fields of a video sequence, or in the header fields of the transfer protocol to be used, such as RTP (Real Time Protocol). According to a preferred embodiment, the identifier data can be transferred using a Supplemental Enhancement Information (SEI) mechanism. SEI provides a data delivery mechanism that is transferred synchronously with the video data content, thus assisting in the decoding and displaying of the video sequence. The SEI mechanism, particularly when used for transferring layer and sub-sequence information, is disclosed more in detail in the ITU-T standard document ITU-T Rec. H.264 (ISO/IEC 14496-10:2002), Annex D. In the cases, wherein a separate transfer protocol or mechanism is used for identifier data transfer, traffic shaping can be carried out also at one of the network elements of the transfer path. In addition, the receiving terminal device can control the decoding.

If the encoder or decoder supports reference picture selection, video sequence coding requires that decoded image frames be buffered before the coding so as to allow the relationships between different image frames to be temporally predicted from one or more other image frames. Image frame buffering can be arranged at least in two different ways, either as sliding windowing or as adaptive buffer memory control. In sliding windowing, M image frames that were coded last are used as a buffer. The frames in the buffer memory are in a decoded and reconstructed form, which allows them to be used as reference images in the coding. As the coding proceeds, the image frame buffering functions on the basis of the FIFO principle (First-In-First-Out). Images that are not used as reference images, such as conventional B-images, do not need to be stored in the buffer. Alternatively, the buffering can be also be implemented as adaptive buffer memory control, in which case the image buffering is not restricted to the FIFO principle, but image frames that are not needed can be removed from the buffer in the middle of the process, or, correspondingly, some image frames can be stored in the buffer for a longer period of time, if they are needed as reference images for later image frames. A known reference picture selection is implemented by indexing image frames that are in the buffer memory into a specific order, the image indices being then used to refer to an image in connection with motion-compensation, for example. This indexing method generally provides better compression efficiency compared to using image numbers, for example, for referring to a specific image when motion-compensation reference images are to be signalled.

The above reference image indexing method is sensitive to transfer errors, because the buffers of the sender's encoder and the recipient's decoder must contain mutually corresponding reconstructed images in identical order to ensure that the encoder and decoder both form the same indexing order. If the image frames are indexed in different order in the buffers of the encoder and the decoder, an incorrect reference image may be used in the decoder. To prevent this, it is essential that the decoder can be controlled to take into account image frames and sub-sequences that the encoder has intentionally removed from the video sequence. In that case the image frame numbering may comprise gaps, which the decoder typically interprets as errors and tries to reconstruct the image frames interpreted as lost. For this reason, it is essential that the encoder is capable to inform the decoder that the discontinuities in the image numbering of the transmitted image frames are intentional.

In response to this, and provided that sliding windowing is used for buffering the image frames, the decoder enters into the buffer memory a number of image frames, the contents of which may be fully random, corresponding to the missing image numbers. These random image frames are then designated by an identifier "invalid" to indicate that the frames in question do not belong to the actual video sequence, but are only filler frames entered for purposes of buffer memory management. A filler frame can naturally be implemented using only memory indicators, i.e. no data is preferably entered into the buffer memory, but memory management is used merely to store a reference to a generic "invalid" frame. The entering of the image frames of the actual video sequence continues from the correct image frame number after the number of filler frames indicated by the missing image numbers has been entered into the buffer, which allows the buffer memories of the encoder and the decoder to be kept preferably in synchronism. If during decoding a reference to an image number is detected which is then found to indicate a filler frame located in the buffer, error correction actions are initiated in the decoder to reconstruct the actual reference image, for example by asking the encoder to re-transmit the reference image in question.

Further, the procedure of the invention allows separate buffer memories to be used on the different scalability layers, or, correspondingly, sub-sequence-specifically. Each scalability layer may thus have a separate buffer memory that is conceptually separate and functions on the basis of the sliding window principle. Similarly, each sub-sequence may also be provided with a conceptually separate buffer memory that also functions on the basis of the sliding window principle. This means that the buffer memory is always emptied when a sub-sequence terminates. Separate buffer memories can be used in a preferred manner for reducing the need for signalling in certain situations in which ordinary sliding window buffering would be inadequate and actively adaptive buffer memory management would need to be used instead.

The H.26L standard defines a picture order count as a picture position in output order. The decoding process specified in the H.26L standard uses picture order counts to determine default index orderings for reference pictures in B slices, to represent picture order differences between frames and fields for vector scaling in motion vector prediction and for implicit mode weighted prediction in B slices, and to determine when successive slices in decoding order belong to different pictures. The picture order count is coded and transmitted for each picture.

In one embodiment of the invention, the decoder uses the picture order count to conclude that pictures are temporally overlapping, i.e., pictures that have an equal picture order count are temporally overlapping. Preferably, the decoder outputs only the picture on the highest received layer. In the absence of layer information, the decoder concludes that the latest temporally overlapping picture in decoding order resides on highest received layer.

The above disclosure describes a procedure for coding video frames for the purpose of producing a scalable, compressed video sequence. The actual procedure is carried out in a video encoder, such as the compressor 108 of FIG. 1, which may be any known video encoder. For example a video encoder according to the ITU-T recommendation H.263 or H.26L may be used, the video encoder being arranged to form, in accordance with the invention, a first sub-sequence into a video sequence, at least part of the sub-sequence being formed by coding I-frames; to form at least a second sub-sequence into the video sequence, at least part of the sub-sequence being formed by coding at least P- or B-frames, and at least one video frame of the second sub-sequence being predicted from at least one video frame of the first sub-sequence; and to determine into the video sequence the identification data of at least the video frames of the second sub-sequence.

According to the procedure of the invention, each sub-sequence of a particular scalability layer is preferably independently decodable, naturally taking into account dependencies from higher scalability layers and possibly other sub-sequences of the same scalability layer. A scalably compressed video sequence such as the one described above can thus be decoded by decoding a first sub-sequence of a video sequence, at least part of the sub-sequence having been formed by coding at least I-frames, and by decoding at least a second sub-sequence of the video sequence, at least part of the second sub-sequence having been formed by coding at least P- or B-frames, and at least one video frame of the second sub-sequence having been predicted from at least one video frame of the first sub-sequence, and by determining the identification and dependency data of at least the video frames comprised by the second sub-sequence of the video sequence, and by reconstructing at least part of the video sequence on the basis of the sub-sequence dependencies.

The actual decoding takes places in the video decoder, such as the decompressor 118 of FIG. 1, which may be any known video decoder. For example, a low bit rate video decoder according to the ITU-T recommendation H.263 or H.26L may be used, which in this invention is arranged to decode a first sub-sequence of a video sequence, at least part of the sub-sequence having been formed by coding I-frames; to decode at least a second sub-sequence of the video sequence, at least part of the second sub-sequence having been formed by coding at least P- or B-frames and at least one video frame of the second sub-sequence having been predicted from at least one video frame of the first sub-sequence. The video decoder is arranged to determine the identification and dependency data of at least the video frames comprised by the second sub-sequence of the video sequence and to reconstruct at least part of the video sequence on the basis of the dependencies of the sub-sequences.

An essential aspect in the operation of the streaming system of the invention is that the encoder and decoder are positioned at least so that the encoder is operationally connected to the streaming server and the decoder is operationally connected to the receiving terminal device. However, the different elements of the streaming system, terminal devices in particular, may include functionalities that allow two-way transfer of multimedia files, i.e. transmission and reception. The encoder and decoder can thus be implemented in the form of what it known as a video codec integrating both encoder and decoder functionalities.

It is to be noted that according to the invention the functional elements of the above described streaming system and its elements, such as the streaming server, video encoder, video decoder and terminal are preferably implemented by means of software, by hardware solutions, or as a combination of the two. The coding and decoding methods of the invention are particularly suitable for implementation as computer software comprising computer-readable commands for executing the process steps of the invention. A preferred way of implementing the encoder and the decoder is to store them in a storage means as a program code that can be executed by a computer-like device, for example a personal computer (PC) or a mobile station, to provide coding/decoding functionalities on the device in question.

Another alternative is to implement the invention as a video signal comprising a scalably compressed video sequence which in turn comprises video frames coded according to at least a first and a second frame format, the video frames according to the first frame format being independent of other video frames, and the video frames of the second frame format being predicted from at least one of the other video frames. According to the invention, the video signal in question comprises at least a first sub-sequence, at least part of which has been formed by coding at least video frames of the first frame format; at least a second sub-sequence, at least part of which has been formed by coding at least video frames of the second frame format; and at least one video frame of the second sub-sequence having been predicted from at least one video frame of the first sub-sequence; and at least one data field that determines video frames belonging to the second sub-sequence.

It is apparent to a person skilled in the art that as technology advances the basic idea of the invention can be implemented in various ways. The invention and its embodiments are therefore not restricted to the above examples, but they may vary within the scope of the claims.

The invention claimed is:

1. A method for coding video frames for the purpose of forming a scalable, compressed video sequence comprising video frames coded according to at least a first and a second frame format, the video frames of the first frame format being independent of other video frames, and the video frames of the second frame format being predicted from at least one other video frame, the method comprising encoding, at an encoder, the video sequence as at least part of a first sub-sequence, at least part of which has been formed by coding video frames of the at least first frame format; and encoding, at the encoder, the video sequence as at least a second sub-sequence, at least part of which has been formed by coding at least video frames of the second frame format, and at least one video frame of the second sub-sequence has been predicted from at least one video frame of the first sub-sequence;

determining a dependency between at least the video frames of the second sub-sequence and at least one video frame of the first sub-sequence; and encoding said dependency into the video sequence.

2. A method according to claim 1, further comprising coding the video sequence into a plural number of scalability layers; and determining the dependency of the video frames of the second sub-sequence such that at least one video frame of the second sub-sequence is predicted from a group comprising a video frame of a higher scalability layer, a video frame of another sub-sequence in the same scalability layer.

3. A method according to claim 2, further comprising determining the dependencies of the video frames of the second sub-sequence on the basis of at least a scalability layer identifier and a sub-sequence identifier.

4. A method according to claim 2, further comprising coding the first scalability layer of the video sequence to comprise video frames according to one frame format, each one of the frames forming a separate sub-sequence.

5. A method according to claim 2, further comprising coding the first scalability layer of the video sequence to comprise video frames according to both the first and the second frame format.

6. A method according to claim 2, further comprising determining a unique identifier for each video frame as a combination of layer number, sub-sequence identifier and image number.

7. A method according to claim 2, further comprising determining a unique identifier for each video frame on the basis of the image number.

8. A method according to claim 6, further comprising adding the identifier to the header field of the video sequence or to the header field of the transfer protocol to be used for transferring the video sequence.

9. A method according to claim 6, further comprising adding the identifier to the Supplemental Enhancement Information (SLI) data structure to be transmitted synchronously with the video sequence.

10. A method according to claim 1, wherein the video frames of the first frame format are I-frames and the video frames of the second frame format are temporally forward and/or backward predicted P-frames, which have been predicted using at least one reference image.

11. A method according to claim 1, further comprising coding the sub-sequences in such a way that at least some of the sub-sequence frames are temporally at least partly overlapping.

12. A method according to claim 1, further comprising coding the video frames in such a way that the temporal predicting taking place between the video frames is block- or macroblock-specific.

13. A video encoder for forming a scalable, compressed video sequence comprising video frames coded according to at least a first and a second frame format, the video frames of the first frame format being independent of other video frames, and the video frames of the second frame format being predicted from at least one other video frame, wherein the video encoder is configured to form into the video sequence a first sub-sequence, at least part of which is formed by coding at least video frames of the first frame format;

form into the video sequence at least a second sub-sequence, at least part of which is formed by coding at least video frames of the second frame format, at least one video frame of the second sub-sequence having been predicted from at least one video frame of the first sub-sequence;

determine a dependency between at least the video frames of the second sub-sequence and at least one video frame of the first sub-sequence; and encode said dependency into the video sequence.

14. A method for decoding a scalably compressed video sequence comprising video frames coded according to at least a first and a second frame format, the video frames of the first frame format being independent of the other video frames, and the video frames of the second frame format being predicted from at least one of the other video frames, the method comprising decoding, at a decoder, a first sub-sequence of the video sequence, at least part of the first sub-sequence being formed by coding at least video frames of the first frame format;

decoding, at the decoder, at least a second sub-sequence of the video sequence, at least part of the second sub-sequence being formed by coding at least video frames of the second frame format, at least one video frame of the second sub-sequence having been predicted from at least one video frame of the first sub-sequence;

determining, at the decoder, dependency data relating at least to the video frames comprised by the second sub-sequence of the video sequence; and reconstructing, at the decoder, at least part of the video sequence on the basis of the dependencies of the sub-sequences.

15. A method according to claim 14, wherein video frames are entered into a sliding buffer memory in connection with decoding, further comprising decoding from the video sequence an indication informing that the discontinuities in the numbering of the images of the image frames in the video sequence are intentional;

configuring, in response to the indication, the buffer memory to comprise a number of image frames corresponding to the missing image numbers; and continuing the entering of the image frames comprised by the video sequence in question into the buffer memory from the correct image frame number after the buffer memory has been configured to comprise the number of image frames corresponding to the missing image numbers.

16. A method according to claim 15, further comprising entering into the buffer memory a number of filler frames corresponding to the missing image numbers.

17. A method according to claim 14, further comprising decoding the video sequence by removing at least one independently decodable sub-sequence from the video sequence.

18. A method according to claim 14, further comprising initiating the decoding from a random point in the video sequence;
determining an independently decodable sub-sequence that is next after the random point, and
setting the value of the image number of the first video frame in the sub-sequence at zero.

19. A method according to claim 14, further comprising identifying at least partly temporally overlapping sub-sequence frames from the video sequence based on the picture order count information, and
outputting from the decoder the last image frame in the decoding order, said frame being selected from a group of said at least partly temporally overlapping image frames.

20. A video decoder for decoding a scalably compressed video sequence comprising video frames coded according to at least a first and a second frame format, the video frames of the first frame format being independent of the other video frames, and the video frames of the second frame format being predicted from at least one of the other video frames, wherein the video decoder is configured to
decode a first sub-sequence of the video sequence, at least part of which is formed by coding at least video frames of the first frame format;
decode at least a second sub-sequence of the video sequence, at least part of which is formed by coding at least video frames of the second frame format, and at least one video frame of the second sub-sequence having been predicted from at least one video frame of the first sub-sequence;
determine the dependency data of at least the video frames comprised by the second sub-sequence of the video sequence; and
reconstruct at least part of the video sequence on the basis of the dependency of the sub-sequences.

21. A computer program product, stored on a non-transitory computer readable medium and executable in a data processing device, for coding video frames so as to form a scalable, compressed video sequence comprising video frames coded according to at least a first and a second frame format, the video frames of the first frame format being independent of the other video frames, and the video frames of the second frame format being predicted from at least one of the other video frames, wherein the computer program comprises
a program code for forming a first sub-sequence of the video sequence, at least part of the sub-sequence being formed by coding at least video frames of the first frame format;
a program code for forming at least a second sub-sequence of the video sequence, at least part of the sub-sequence being formed by coding at least video frames of the second frame format, and at least one video frame of the second sub-sequence having been predicted from at least one video frame of the first sub-sequence;
a program code for determining a dependency between at least the video frames of the second sub-sequence and at least one video frame of the first sub-sequence; and
a program code for encoding said dependency into the video sequence.

22. A computer program product, stored on a non-transitory computer readable medium and executable in a data processing device, for decoding a scalably compressed video sequence comprising video frames coded according to at least a first and a second frame format, the video frames of the first frame format being independent of the other video frames, and the video frames of the second frame format being predicted from at least one of the other video frames, wherein the computer program comprises
a program code for decoding a first sub-sequence of the video sequence, at least part of the sub-sequence being formed by coding at least video frames of the first frame format; and
a program code for decoding at least a second sub-sequence of the video sequence, at least part of the sub-sequence being formed by coding at least video frames of the second frame format, and at least one video frame of the second sub-sequence having been predicted from at least one video frame of the first sub-sequence; and
a program code for determining the dependency data of at least the video frames comprised by the second sub-sequence of the video sequence; and
a program code for reconstructing at least part of the video sequence on the basis of the dependency of the sub-sequences.

23. A method for coding video frames for the purpose of forming a scalable, compressed video sequence comprising video frames coded according to at least a first and a second frame format, the video frames of the first frame format being independent of the other video frames, and the video frames of the second frame format being predicted from at least one of the other video frames, the method comprising
encoding, at an encoder, the video sequence as at least part of a first sub-sequence, at least part of which has been formed by coding video frames of the at least first frame format;
encoding, at the encoder, the video sequence as at least a second sub-sequence, at least part of which has been formed by coding at least video frames of the second frame format, and at least one video frame of the second sub-sequence has been predicted from at least one video frame of the first sub-sequence; and
encoding, at the encoder, into the video sequence information indicating which video frames belong to the second sub-sequence, wherein subsequence information is different from picture type information.

24. A method according to claim 23, wherein
a removal of the second subsequence from the bitstream does not prevent decoding of the bitstream correctly.

* * * * *

UNITED STATES PATENT AND TRADEMARK OFFICE
CERTIFICATE OF CORRECTION

PATENT NO. : 7,894,521 B2
APPLICATION NO. : 10/306942
DATED : February 22, 2011
INVENTOR(S) : Miska Hannuksela It is certified that error appears in the above-identified patent and that said Letters Patent is hereby corrected as shown below:

In the Claims

Column 23, line 66, Claim 9: "(SLI)" should read --(SEI)--.

Signed and Sealed this
Seventh Day of June, 2011

David J. Kappos
*Director of the United States Patent and Trademark Office*